US010733378B2

(12) United States Patent
Moah et al.

(10) Patent No.: US 10,733,378 B2
(45) Date of Patent: Aug. 4, 2020

(54) ANALYSIS OF MESSAGE QUALITY IN A NETWORKED COMPUTER SYSTEM

(71) Applicant: Baydin, Inc., Mountain View, CA (US)

(72) Inventors: Aye Moah, Mountain View, CA (US); Alexander Moore, Mountain View, CA (US); Michael Chin, Mountain View, CA (US)

(73) Assignee: Baydin, Inc., Mountain View, CA (US)

( * ) Notice: Subject to any disclaimer, the term of this patent is extended or adjusted under 35 U.S.C. 154(b) by 359 days.

(21) Appl. No.: 15/462,584

(22) Filed: Mar. 17, 2017

(65) Prior Publication Data

US 2018/0267951 A1 Sep. 20, 2018

(51) Int. Cl.
*G06F 15/16* (2006.01)
*G06F 40/253* (2020.01)
*G06F 3/0484* (2013.01)
*G06F 3/0482* (2013.01)
*H04L 12/58* (2006.01)

(52) U.S. Cl.
CPC .......... *G06F 40/253* (2020.01); *G06F 3/0482* (2013.01); *G06F 3/04847* (2013.01); *H04L 51/16* (2013.01); *H04L 51/22* (2013.01)

(58) Field of Classification Search
USPC ........................................................ 709/206
See application file for complete search history.

(56) References Cited

U.S. PATENT DOCUMENTS

| 2003/0229531 | A1* | 12/2003 | Heckerman | G06Q 30/02 705/14.41 |
| 2006/0253537 | A1* | 11/2006 | Thomas | G06Q 10/107 709/206 |
| 2009/0198652 | A1* | 8/2009 | Guy | G06Q 10/00 |
| 2010/0057856 | A1* | 3/2010 | O'Sullivan | G06Q 10/107 709/206 |
| 2013/0204700 | A1* | 8/2013 | Synett | G06N 5/02 705/14.53 |
| 2013/0282841 | A1* | 10/2013 | Bates | H04L 51/32 709/206 |
| 2014/0040019 | A1* | 2/2014 | Zheng | G06Q 30/0246 705/14.45 |
| 2014/0201296 | A1* | 7/2014 | Patfield | H04L 51/04 709/206 |
| 2018/0032888 | A1* | 2/2018 | Modarresi | H04L 51/34 |

\* cited by examiner

*Primary Examiner* — Anthony Mejia
(74) *Attorney, Agent, or Firm* — Foley & Lardner LLP

(57) ABSTRACT

Systems and methods for dynamically assessing and displaying quality features of electronic messages, while composed on client devices, can include one or more processors monitoring the process of composing the electronic message. The one or more processors can retrieve, upon detecting a pause event, data associated with the composed electronic message from a message composing container, and determine a plurality of feature values for a plurality of features of the electronic message based on the retrieved data. The one or more processors can determine, based on the plurality of feature values, a likelihood of receiving a response from a receiving entity once the electronic message is sent to that receiving entity. The one or more processors can provide an indication of the determined likelihood of receiving a response and indications of the plurality of determined feature values for display in association with a message composing window displaying the text received.

20 Claims, 6 Drawing Sheets

ANALYSIS OF MESSAGE QUALITY IN A NETWORKED COMPUTER SYSTEM

BACKGROUND

Processing electronic messages in a networked computer system to analyze message quality can be technically challenging. In particular, analyzing message quality can involve computationally expensive text processing with substantial time delay. Considering that the message quality analysis is desired to be performed prior to sending the electronic message, the analysis can lead to undesired delays in message exchange processes. Furthermore, reliability and accuracy of the analysis results is another challenge. Specifically, message quality can be a subjective measure and the analysis results can depend on message features selected for assessment.

Electronic mail (email) technology, for example, allows for exchange of digital messages between computer users across computer networks. Whether for business reasons or personal reasons, millions of people exchange electronic messages on a daily basis. Emails exchanged between computer users may, in many cases, substitute face-to-face conversations, for instance, in transaction negotiations, management activities, research collaboration efforts, job seeking or recruiting efforts, social interactions, or other aspects of people's life. When communicating face-to-face, a person can get an immediate response or feedback with respect to the effect of the communicated message(s) on the listener, for example, via facial expressions, eye contact, verbal response, or other communicative conduct. However, when communicating via email (or other electronic messaging technology), users are usually remote from one another, and a user has to rely on the content of the composed message(s) to convey any idea(s) to the other party. Automatic and reliable electronic message quality assessment tools can provide meaningful and reliable feedback to computer users.

SUMMARY

Implementations described herein relate to providing real time assessment of electronic messages while composed on client devices. In particular, implementations described herein relate to generating and providing a quality assessment feedback to users while they are composing electronic messages on their client devices. For each composed electronic message, the respective quality assessment feedback can be indicative of the quality of that composed message.

At least one aspect of the present disclosure relates to a system to dynamically assess and display quality of electronic messages while composed on client devices. The system can include a data processing system communicatively coupled to a client device and a software module for running on the client device. The software module can include a composition monitoring component and a rendering component. The data processing system can include an analysis component and a prediction component. The composition monitoring component can monitor text received, via an input interface of the client device, as part of an electronic message while the electronic message is composed on the client device. The received text can be stored in a message composing container. The composition monitoring component can retrieve, upon detecting a pause in composing the electronic message, a portion of the text from the message composing container, and transmit the retrieved portion of the text to the data processing system via a communications network. The text analysis component can determine a plurality of feature values for a plurality of features of the text based on the retrieved portion. The predictive component can determine, based on the determined plurality of feature values, a likelihood of receiving a response from a receiving entity once the electronic message is sent to that receiving entity. The rendering component can cause, upon receiving the determined likelihood of receiving a response and the plurality of determined feature values, display of an indication of the determined likelihood of receiving a response and indications of the plurality of determined feature values on the client device in association with a message composing window displaying the text.

At least one aspect of the present disclosure relates to a method of dynamically assessing and displaying quality of electronic messages while composed on client devices. The method can include one or more processors monitoring text received as part of an electronic message while the electronic message is composed via an input interface of a client device. The text can be stored in a message composing container. The one or more processors can retrieve, upon detecting a pause in inputting the text, a portion of the text from the message composing container. The one or more processors can determine a plurality of feature values for a plurality of features of the electronic message by processing the retrieved portion of the text. The one or more processors can determine, based on the plurality of feature values, a likelihood of receiving a response from a receiving entity once the electronic message is sent to that receiving entity. The one or more processors can provide an indication of the determined likelihood of receiving a response and indications of the plurality of determined feature values for display in association with a message composing window displaying the text received.

At least one aspect relates to a non-transitory computer-readable medium including code instructions stored thereon. The computer code instructions, when executed by one or more processors, cause the one or more processors to monitor text received as part of an electronic message while the electronic message is composed via an input interface of a client device. The text can be stored in a message composing container. The one or more processors can retrieve, upon detecting a pause in inputting the text, a portion of the text from the message composing container, and determine a plurality of feature values for a plurality of features of the electronic message by processing the retrieved portion of the text. The one or more processors can determine, based on the plurality of feature values, a likelihood of receiving a response from a receiving entity once the electronic message is sent to that receiving entity. The one or more processors can provide an indication of the determined likelihood of receiving a response and indications of the plurality of determined feature values for display in association with a message composing window displaying the text received.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
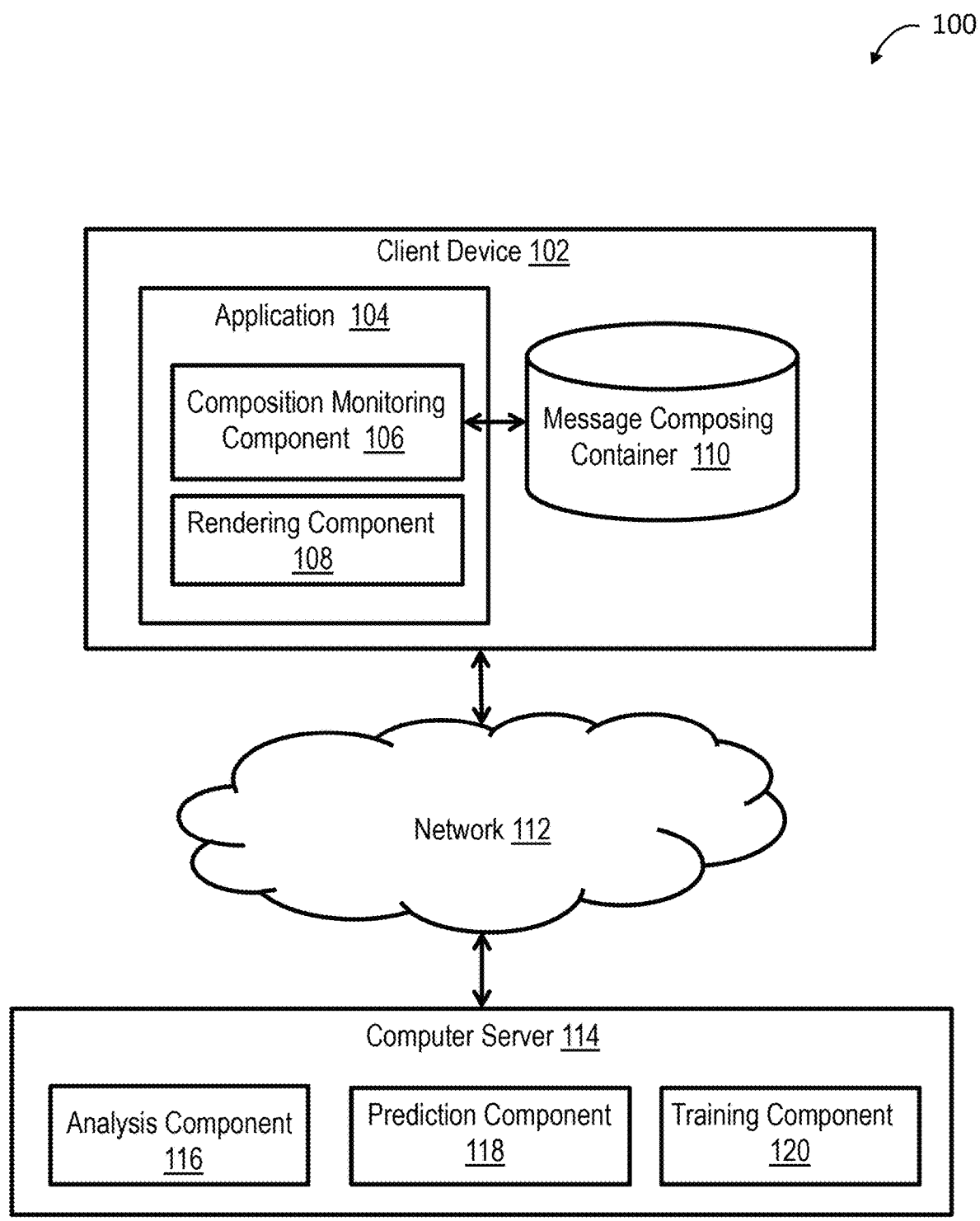
FIG. 1 is a block diagram of a computer environment including a system for dynamically assessing and displaying feature values of electronic messages while composed on client devices.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and implementations of, methods, apparatuses, and systems for assessing and displaying quality scores of an electronic message while the electronic message is being composed on a client device. The various concepts introduced above and discussed in greater detail below may be implemented in any of numerous ways as the described concepts are not limited to any particular manner of implementation. Examples of specific implementations and applications are provided primarily for illustrative purposes. The example of the present disclosure wherein an electronic message is an email is referred to repeatedly below, but it should be understood that the disclosure may be generalized and applicable to other forms of electronic messages as well.

Assessing electronic messages' effectiveness, e.g., with regard to leading to responses from respective recipients, can be of great value to computer users but is technically challenging. In particular, automatic assessment of messages' effectiveness can involve expensive deep text processing. Such text processing is computationally costly and introduces undesired time delays in processes of exchanging electronic messages. Furthermore, another challenge is providing objective rather than subjective assessment of electronic messages' effectiveness.

When composing an email, for example, to apply for a job, ask for a promotion, or try to close an important deal, a sender usually seeks to increase his chances of impressing the recipient of the composed email and receiving a response. For example, while composing the email, the sender may wonder whether the drafted email is too short to address all the ideas to be conveyed, or unnecessarily long making it tedious and boring to read. The sender may also question the tone, the style (e.g., formal or informal), the reading level, or the subjectivity of the drafted email. These characteristics of the email can substantially influence the message effectiveness (also referred to herein as message quality) with regard to inducing the proper impression in the recipient and increase the chances of a response. However, striking the "proper" level or degree for each of these characteristics when composing an email can be a subjective assessment. For instance, the "proper" level or degree for each of the characteristics can depend on the recipient's profile, the context of the email, or the relationship between sender and recipient.

Some computer users may have their emails reviewed and edited by others before sending to intended recipients. However, the option of human review or editing is subjective and may not be consistently available or practical. For instance, in a business where a large number (e.g., hundreds or thousands) of emails are exchanged on a daily basis, human editing of such emails may be time consuming, costly, or otherwise impractical. Also, the results of a message review by a human depends on the preferences of the reviewer. Furthermore, for personal emails, a sender may be reluctant to share private or personal information disclosed in an email with others (e.g., other than the intended recipient). The tradeoff between email messages' effectiveness and time and effort efficiency calls for automatic solutions for evaluating the effectiveness of e-mails and proposing edits. Computer-based automatic email quality (or effectiveness) assessment solutions can allow for time efficient analysis of drafted emails and evaluation of respective quality features before sending the emails to intended recipients. As used herein, the quality features of a message can include any features or attributes (e.g., subject length, message body length, questions' count, reading level, positivity, politeness, subjectivity, or combination thereof) that are relevant to, or have an effect on, the message effectiveness. The computer-based automatic solutions can also allow for protecting user (e.g., sender) privacy.

Providing automatic machine-based email quality (or effectiveness) assessment solutions can be technically challenging for multiple reasons. First, in analyzing and assessing the quality features of an electronic message, a data processing system may be desired to consider multiple factors that can affect the accuracy of the analysis results. For example, in evaluating the quality or effectiveness of an email message, such as assessing how proper is the tone or style of the message or how likely would the message result in a respective response, the data processing system can take into account the recipient's profile, the context of the message, or the relationship between the sender and recipient. Second, in assessing some email quality features, such as positivity, politeness, or subjectivity, the data processing system may perform deep and complex text and data analysis. Third, users may be more attracted to and more willing to rely on real-time email editing solutions than offline or asynchronous editing approaches. However, the complexity of the text and data analysis that may be involved in assessing some email quality features may call for time consuming and computationally costly data processing techniques by the data processing system, making real-time email editing technology even more challenging. Finally, the way the data processing system renders the results of analyzing and assessing the quality features of an electronic message can have a substantial effect on user experience. For example, designing the data processing system to provide values of assessed quality features in a separate document may be a discouraging factor for users since it would involve switching between various display windows (or documents) and generating additional documents that may unnecessarily consume memory resources.

In order to address the technical challenges described above, a data processing system can include a plurality of quality feature assessment components (or modules) to assess various quality features. The data processing system can execute the quality feature assessment components in parallel to improve processing speed and provide quality feature assessment results in real time (or near real time). The data processing system can perform the quality feature assessment while the electronic message is composed on a client device, for example, during pause events. One or more components can include machine learning models trained using training data. By using various training data sets or distinct weights for different training data, the data processing system can make use of separate machine learning trained models based on separate factors, such as the recipient's profile, the context of the message, or the relationship between the sender and recipient. The data processing system can also display results of the performed analysis or assessment of the quality features in association with a window (or a user interface) that displays the composed electronic message on a screen of the client device.

According to aspects of the present disclosure, systems and methods for dynamically assessing electronic message quality in real-time can include one or more processors that monitor a process of composing an electronic message by a user on an electronic device. As used herein, real time assessment of the electronic message quality refers to evaluation of quality features of the electronic message while the electronic message is composed by the user on the client device. Upon detecting a pause in the process of composing the electronic message, a processor of the client device can retrieve text already input as part of the electronic message, or a portion thereof, from a container storing the input text. The one or more processors can analyze the text and determine the values for a plurality of quality features of the text. The one or more processors can predict, using the determined quality features' values, a likelihood of receiving a response from a recipient once the electronic message is sent to that recipient. The one or more processors can display the determined likelihood of receiving a response and the determined quality features' values on the client device in association with a message composing window displaying the text. The one or more processors can display the determined likelihood and the determined quality features' values while the user is composing the electronic message.

The assessment of the electronic message and display of assessment results during the composing process allows the user to edit the respective electronic message before sending to the intended recipient. Specifically, the one or more processors can provide real-time dynamic feedback to the user while the user is drafting the electronic message (e.g., email). The user can edit the electronic message based on displayed feedback information indicative of assessed quality of the composed text. As the user edits or continues drafting the electronic message, the one or more processors can re-assess the updated text and re-display updated feedback information based on the new assessment of the input text. The one or more processors can repeat the process of assessing the composed text and displaying the feedback information while the user is still composing the electronic message. The user can keep editing the composed electronic message until the feedback information indicates relatively high quality values and a relatively high likelihood of receiving a response from the intended recipient. Accordingly, the systems and methods described herein provide a dynamic message assessment framework to guide and assist users to draft effective electronic messages.

While some examples described herein relate to email, the systems and methods of this disclosure can be applicable to other electronic messaging solutions such as chat, short message service (SMS), teleconference services, voice over Internet protocol (VoIP), or other electronic messaging solutions.

FIG. 1 is a block diagram of a computer environment 100 including a system for dynamically assessing and displaying quality features' scores of electronic messages while composed on client devices. The computer environment 100 can include a client device 102 communicatively coupled to a data processing system 114 via a communications network 112. The data processing system 114 can include at least one computer server. While FIG. 1 shows a single client device 102, the computer system 100 can include a plurality of client devices 102 communicatively coupled to the data processing system 114 through the network 112. The data processing system 114 can include a plurality of computer servers. The network 112 can include a local area network (LAN), wide area network (WAN), a telephone network, such as the Public Switched Telephone Network (PSTN), a wireless link, an intranet, the Internet, or a combination thereof.

The client device 102 can include a local machine, computer, laptop, desktop, smart phone, tablet, personal digital assistant, set-top box for a television set, a smart television, or server device configured to communicate with other devices via the network 112. The client device 102 can include a processor and a memory. The memory may store machine instructions that, when executed by the processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The processor may include a microprocessor, an application-specific integrated circuit (ASIC), a field-programmable gate array (FPGA), etc., or combinations thereof. The instructions may include code from any suitable computer programming language such as, but not limited to, ActionScript®, C, C++, C#, HTML, Java®, JavaScript®, Perl®, Python®, Visual Basic®, and XML.

The client device 102 can include (or execute) a software module 104 for assessing the quality of electronic messages while composed (e.g., a web browser or other application), and a message composing container 110 for storing data (e.g., input text) input by a user of the client device. The data processing system 114 or a web server may provide the software module 104 to the client device 102. For example, the client device 102 may download the software module 104 from the data processing system 114. The software module 104 can include a composition monitoring component 106 and a rendering component 108. In some instances, the software module 104 can be an email application, such as a web email application or enterprise email application, a chat application, a short message service (SMS) application, an online meetings' application, a voice over Internet protocol (VoIP) application, a teleconference application, or other application that provides electronic messaging capabilities and that incorporates or integrates the composition monitoring component 106 and the rendering component 108. In some other instances, the software module 104 may be separate from, but configured to interact with, an instance of an application for electronic messaging running on the client device 102. Specifically, the composition monitoring component 106 and the rendering component 108 may be implemented as a separate software application or may be integrated in applications providing electronic messaging solutions. The software module may implemented using scripted language (e.g., JavaScript or Python), non-scripted language (e.g., C, C++, C#, or Java), or other forms of computer executable instructions.

The message composing container 110 can include a memory area (or memory portion) of the client device 102 allocated to an electronic messaging application (or an instance thereof) running on the client device 102. The message composing container 110 may include a data file (e.g., a Word document data file or an XML data file), a data structure, or any combination thereof. The client device 102 may allocate a memory area of a message composing container 110 to the electronic messaging application responsive to, for example, a user of the client device initiating composition of a new electronic message (e.g., opening a "new email" window). If the user initiates composition of multiple electronic messages (e.g., opening multiple "new email" windows), the client device 102 may allocate multiple memory areas of multiple message composing containers 110, where each message composing container 110 is allocated with a respective electronic message being composed.

The electronic messaging application may use the message composing container 110 to store data input by a user, e.g., via an input interface, while composing an electronic message. The message composing container 110 may include computer code instructions to receive input data or input commands (e.g., a delete command) associated with composing an electronic message from an input interface (e.g., a keyboard, a mouse, or a touch screen) of the client device 102, and update data stored in the memory area associated with the message composing container 110. For example, as the user composes an email message using an email application running on the client device 102, the email application can cause the client device to store data indicative of, for example, text input by the user as part of the email message body, text input as part of header fields (e.g., subject field, recipient field, or carbon copy field) of the email message, documents attached to the email message being composed, or a combination thereof. As the user composes the electronic message, the electronic messaging application may cause the client device 102 to display a user interface or a message composing window presenting (or showing) the composed electronic message.

The message composing container 110 may be configured to store data associated with an electronic message temporarily. For instance, the client device 102 may store such data in the message composing container 110 while the user of the electronic device 102 is composing the electronic message. The client device 102 may delete stored data or de-allocate the memory area associated with the message composing container 110 once the electronic message is sent to an intended recipient (or a device thereof) or cancelled. Also, the client device 102 can update data stored in the message composing container 110 responsive to changes made by the user to one or more portions of the electronic message being composed. In particular, data stored in the message composing container 110 at any point of time can reflect the content associated with the electronic message being composed at that point of time. Input text stored in the message composing container 110 may include plain text, HyperText Markup Language (HTML) text, or text formatted according to other format known in the art.

The composition monitoring component 106 can include a software module executable by the processor of the client device 102. The composition monitoring component 106 may be initiated (or launched) by the client device 102 responsive to initiation of an electronic message composing event on the client device 102. For example, the client device 102 may launch the composition monitoring component 106 upon the user of client device 102 opens a "new email" window to compose an email for sending to a recipient. The client device 102 may launch the composition monitoring component 106 upon the user of the client device 102 starts composing a message, for example, on a chat application, a SMS application, a VoIP application, or a teleconference application.

The composition monitoring component 106 can monitor the process of composing the electronic message or text received via an input interface of the client device as part of the electronic message while the electronic message is composed on the client device 102. For instance, the composition monitoring component 106 can monitor changes to data stored in the message composing container 110. The composition monitoring component 106 may monitor write operations or delete operations executed by the client device 102 in association with the message composing container 110, responsive to changes made by the user of client device to the electronic message being composed. In monitoring the process of composing the electronic message, the composition monitoring component 106 may keep track of time instances associated with memory operations (e.g., delete operations or write operations) executed by the client device 102 to update date stored in association with the message composing container 110. The composition monitoring component 106 may keep track of the time instance associated with the latest executed memory operation executed by the client device 102 to update date stored in association with the message composing container 110. The composition monitoring component 106 may keep track of the amount of data (e.g., in bytes) stored in the message composing container 110.

In some instances, monitoring the process of composing the electronic message can include the composition monitoring component 106 monitoring a user interface displaying the composed electronic message, or the input interface used by the user to input text as part of the composed electronic message. The composition monitoring component 106 may monitor calling of functions associated with a display of the client device (e.g., functions to update displayed electronic message), functions associated with the memory of the client device (e.g., write function), or functions associated with the input interface of the client device 102. In particular, composition monitoring component 106 may monitor the calling of such functions by (or in association with) the electronic messaging application responsive to user interaction with the input interface when composing the electronic message. In some instances, the user of the client device 102 may compose the message via audio or speech input. For example, the client device 102 may translate the input speech signal into a text, and store the text in the message composing container 110.

The composition monitoring component 106 can monitor pauses in the process of composing the electronic message.

A pause can be a time period greater than 0.2 seconds, 0.3 seconds, 0.4 seconds, 0.5 seconds, or some other time threshold value, during which no input is provided by the user as part of the electronic message being composed. The pause may be defined as a time period greater than 0.2 seconds, 0.3 seconds, 0.4 seconds, 0.5 seconds, or some other time threshold value, during which no changes are made to the data stored in the message composing container 110, or to data displayed on the screen of the client device representing the composed message. The composition monitoring component 106 may detect a pause event by maintaining a timer indicative of time elapsed since a latest executed operation (e.g., a memory operation to write or delete data in the message composing container 110, display operation to update display of the composed message, or operations to receive data input via the user interface responsive to the user typing input text) related to an update of the composed message, and comparing the time indicated by the timer to the time threshold value defining the pause. For example, if pause events are defined as time periods longer than 0.2 seconds during which no update is made to the composed message, then the composition monitoring component 106 can detect a pause event upon the timer exceeds 0.2 seconds.

Upon detecting a pause event associated with the composing of the electronic message, the composition monitoring component 106 can initiate a process of analyzing the message composed so far and evaluating or assessing respective quality (or quality scores). For instance, the composition monitoring component 106 may retrieve the text stored in the message composing container 110 or a portion thereof, responsive to detection of a pause event associated with the composing of the electronic message. In some instances, the composing monitoring component 106 may retrieve (or poll) the data stored in the message composing container 110 on a regular or periodic basis during the process of composing the message. In such instances, the composing monitoring component 106 may not be configured to detect pause events. In some embodiments, the composing monitor component 106 may retrieve (or poll) the data stored in the message composing container at regular intervals. In yet other embodiments, the composing monitor component 106 may retrieve (or poll) the data stored in the message composing container in response to other events, such as: a period of inactivity, user interaction with the user interface, a specific request that the quality of the email be assessed, a determination that the user is about to send a message, or any other action or event. The composition monitoring component 106 may remove formatting-specific text (or tags) or coding text (e.g., HTML-specific text or tags) from the retrieved text. By eliminating formatting-specific terms or tags, the composition monitoring component 106 may extract from the retrieved text words and expressions typed by the user of the client device, as part of the composed electronic message, for use in analyzing the composed electronic message and assessing the respective quality.

The composition monitoring component 106 can transmit, via the network 112, the retrieved (and filtered) text to the data processing system 114 for assessing quality scores of the electronic message composed so far. The composition monitoring component 106 can be configured to retrieve text stored in the message composing container 110 and transmit the retrieved text to the data processing system 114 each time a pause event is detected. The composition monitoring component 106 can be configured to transmit the retrieved text to the data processing system 114 over a secure channel.

Once the client device 102 receives indications of quality scores (or quality features' values) of the composed electronic message from the data processing system 114, the rendering component 108 can display the quality scores (or representations thereof) on the display of the client device. The rendering component 108 can display the quality scores in association with the user interface or the message composing window presenting the composed electronic message. For example, the rendering component 108 can display the quality scores adjacent to the composed electronic message, for example, within the user interface or the message composing window. Display of the quality scores by the rendering component 108 is described in further details below with respect to FIGS. 2A and 2B.

The data processing system 114 can include an analysis component 116, a prediction component 118, and a training component 120. Upon the data processing system 114 receiving the text representing the composed electronic message, the analysis component 116 can analyze the received text to assess a respective plurality of quality features. The quality features can include the length of the message subject, the length of the message body, the number of questions in the composed electronic message, the message reading level, or a combination thereof. The analysis component 116 can include one or more software modules executable by the data processing system 114. In determining the length of the message subject, the analysis component 116 can cause the data processing system 114 to count the number of words in the message subject. Also, the analysis component 116 can cause the data processing system 114 to count the number of words in the message body to determine the message body length. Counting the number of words can include locating and counting spaces in the message subject or the message body. In determining the number of questions in the composed electronic message, the analysis component 116 can cause the data processing system 114 to count question marks or question words, such as "who," "what," "when," "where," "why," and "how," used in the composed electronic message (e.g., in the message body or the message subject). The analysis component 116 may cause the data processing system 114 to examine word order in sentences to identify inversions (e.g., inverted relative positions of an auxiliary verb and a respective subject) indicative of questions when counting the number of questions in the composed electronic message.

The analysis component 116 can include software modules implementing, for example, Flesch-Kincaid readability tests or other readability test known in the art, which when executed, cause the data processing system 114 to evaluate factors indicative of, for example, word length, average word length, sentence length, or average sentence length of words and sentences used in the composed electronic message. The analysis component 116 can weigh such factors to determine a reading level of the composed electronic message. The analysis component 116 may evaluate other factors, such as the level of vocabulary associated with the composed electronic message in determining the reading level. For example, the analysis component 116 may employ a predefined classification of words and expressions based on a plurality of predefined vocabulary levels. The analysis component 116 may map words or expressions used in the composed electronic message to respective vocabulary levels based on the predefined classification. The analysis component 116 may assign different weights to the number of words or expressions associated with each vocabulary level in determining the reading level of the composed electronic message.

The analysis component 116 can assess other quality features of the composed electronic message, such as positivity, politeness, subjectivity, or a combination thereof. The analysis component 116 can employ separate models (e.g., neural networks, convolutional neural networks, deep neural networks, convolutional deep neural networks, deep belief networks, recurrent neural networks, or other deep learning models known in the art) for assessing separate quality features. For example, the analysis component 116 can include a first neural network designed to assess composed message positivity, a second neural network designed to assess composed message politeness, and a third neural network designed to assess composed message subjectivity. Each of the first, second, and third neural networks can include a convolutional neural network, a deep neural network, a convolutional deep neural network, or a deep belief network.

The first neural network (or deep learning model) can receive the composed message text (e.g., including subject and body texts) as input and provide a positivity score as output. The second neural network (or deep learning model) can receive the composed message text (e.g., including subject and body texts) as input and provide a politeness score as output. The third neural network (or deep learning model) can receive the composed message text (e.g., including subject and body texts) as input and provide a subjectivity score as output. The positivity, politeness, and subjectivity may be viewed as advanced quality features because the assessment of such quality features involves relatively high computational complexity, for example, compared to assessment of other quality features such as the subject length, the message body length, the number of questions in the composed electronic message, or the message reading level. For instance, the computational complexity of a neural network (e.g., a deep neural network) can increase substantially as the number of neurons (or nodes) in the neural network increases.

The neural networks (or deep learning models) can be trained by the training component 120. The training component 120 can use training data that includes, for example, a plurality of electronic messages and corresponding quality scores. For example, training data for training the positivity neural network can include a plurality of electronic messages (e.g., email messages) with respective positivity scores, training data for training the politeness neural network can include a plurality of electronic messages with respective politeness scores, and training data for training the subjectivity neural network can include a plurality of electronic messages with respective subjectivity scores. The positivity scores, politeness scores, or subjectivity scores in the training data may be defined or generated based on users' or human experts' feedback. For example, experts (e.g., linguistic experts or other professionals) or computer users (e.g., recipients of electronic messages, senders of electronic messages) may evaluate the positivity scores, politeness scores, or subjectivity scores of electronic messages in training data sets. The training component 120 may average quality feature scores assigned to a given electronic message by various users or experts. The training component 120 may assign the average quality feature scores to respective electronic messages in the training data. For instance, the training component 120 may employ the average positivity score associated with a given electronic message in a training data set as the positivity score of that electronic message. Training a neural network can include determining the parameters, such as the weighting coefficients, of that neural network.

The training component 120 may train a plurality of positivity neural networks, a plurality of politeness neural networks, or a plurality of subjectivity neural networks. For instance, the training data may be classified based on one or more criteria (or categories) such as the relationship between the sender and recipient of each electronic message (e.g., family member, friend, or work colleague), the context of the electronic message (e.g., job search, seeking promotion, or dating), or the recipient profile (e.g., manager, recruiter, or friend). The training component 120 may, for example, train a plurality of positivity neural networks, each associated with a respective recipient profile. For instance, the training component 120 may use training data that includes electronic messages related to job search, and respective positivity scores to train a positivity neural network specific to the context of job search. Also, the training component 120 may use training data that includes electronic messages related to dating, and respective politeness scores to train a politeness neural network specific to the context of dating. The training component 120 may also use training data including electronic messages sent (or intended to be sent) to a recruiter, and respective subjectivity scores to train a subjectivity neural network specific to electronic messages intended to be sent to a recruiter.

When receiving text associated with the electronic message being composed on the client device 102, the analysis component 116 may determine, for example, the context of the electronic message, the profile of the intended recipient, or the recipient's relationship to the sender based on data received from the client device 102. For instance, the client device 102 may transmit additional data (e.g., in addition to the composed message text) indicative, for example, of the recipient's profile or recipient's relationship with the sender. The analysis component 116 may select the neural networks to be used to assess the composed message quality scores based on determined criteria, such as the context of the electronic message, the profile of the intended recipient, or the recipient's relationship to the sender.

The analysis component 116 can provide the determined quality scores (or quality features' values), such as the subject length, the message body length, the number of questions in the composed electronic message, the message reading level, the positivity score, the politeness score, and the subjectivity score to the prediction component 118. The prediction component 118 can receive the quality scores determined by the analysis component 116 as input, and predict a likelihood of the message sender receiving a response from the intended recipient once the composed message is sent. The prediction component 118 can include a set of decision trees (also referred to as a decision forest as well as classification and regression trees (CART)) for predicting the likelihood of a response from the intended recipient, based on the determined quality scores. The training component 120 can train the set of decision trees using training data that can include a plurality of electronic messages and respective indications of whether or not those electronic messages resulted in responses sent by respective recipients. For example, for each electronic message in the training data, the respective indication can be a binary number (e.g., with 0 or 1 possible values) or a string (e.g., with "YES" or "NO" possible values) indicating whether or not that electronic message lead to a response from the recipient to the sender. The training component 120 (or the data processing system 114) can collect the training data from a plurality of client devices or user accounts (e.g., email accounts).

The training component 120 can iteratively feed electronic messages in the training data as input to the set of decision trees. For each electronic message fed as input to the set of decision trees, the training component 120 can compare output of the set of decision trees to the respective indication (in the training data) of whether or not that electronic message lead to a responsive from the respective recipient. The training component 120 may update the parameters of the set of decision trees at each iteration based on the result of the comparison at that iteration. The training component 120 may feed the training data as input to the set of decision trees multiple times until convergence is achieved (e.g., the output of the set of decision trees conforms with the indications in the training data).

In some instances, the training component 120 may train a separate decision forest for each user (e.g., sender) or each client device 102. For instance, the training component 120 may collect (or obtain) a plurality of electronic messages previously sent by a given user (or a respective client device) and indications of whether or not such sent messages triggered responses from the respective recipient(s) for use, at least, as a subset of the training data to train a decision forest specific to that user (or specific to the respective client device). For example, the training component 120 may obtain a user's sent email messages from the "Sent Items" box of that user, and may determine whether or not each of the sent email messages lead to a response from the respective recipient based on email messages in the user's "Inbox." The training component 120 may use the sent email messages and the respective indications as a subset of the training data to train a forest decision specific to that user. The training component 120 may assign different weight values to the user's electronic messages in the training data than other electronic messages from other users. For example, when training a decision forest specific to a user, the training component 120 may weigh each message from that user in the training data higher than other messages in the training data. In some instances, the training component 120 may train a separate decision forest for each sender-recipient pair by using one or more messages previously sent from the sender (in the sender-recipient pair) to the recipient (in the sender-recipient pair) as at least a subset of the training data. The training component 120 may weigh the one or more messages with higher weighting values than other messages in the training data. In some instances, the training component 120 may train separate decision forests for various recipient profiles, various sender-recipient relationships, or various message contexts using, for example, various training data sets to train each decision forest. Trained decision forests can be stored in a memory associated with the data processing system 114.

The analysis component 116 can retrieve the "proper" decision forest (e.g., a proper decision forest specific to the sender or the sender-recipient pair) from memory when receiving data associated with the electronic message being composed from the client device 102. The analysis component can feed determined quality scores to the decision forest as input to generate a likelihood of the composed electronic message triggering the intended recipient to send a response back to the user of the client device 102, responsive to receiving the composed message. The analysis component 116 (or the data processing system 114) can transmit the determined quality scores and the generated likelihood of a response from the intended recipient to the client device 102. On the client device 102, the rendering component 108 can display representations of the determined quality scores and the generated likelihood of a response from the intended recipient in association with the message composing window displaying the composed message on a screen of the client device 102.

Figure 2A:
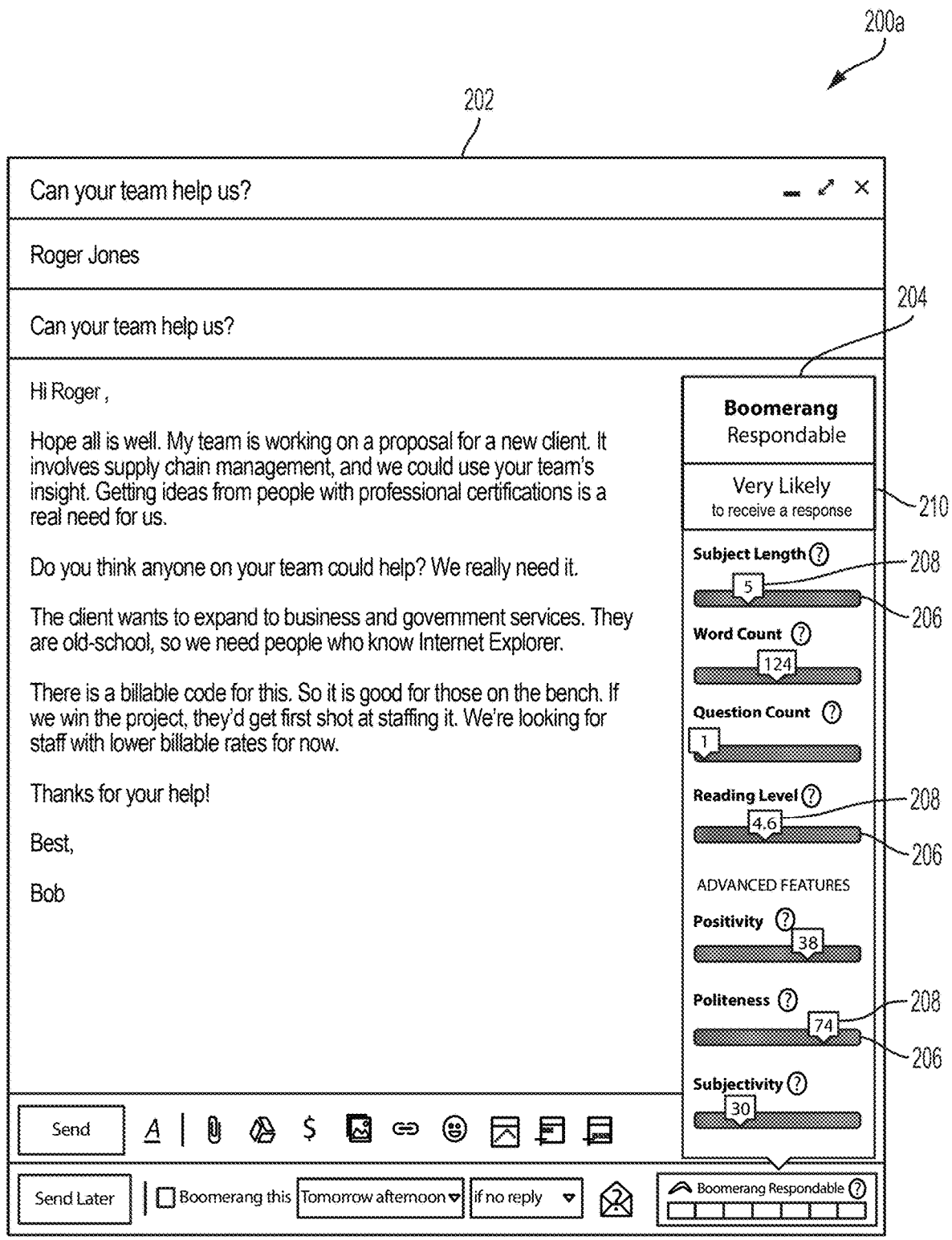
FIGS. 2A and 2B show screen shots of a message composing window 202 displaying representations of feature values of an electronic message and a response likelihood.
Figure 2B:
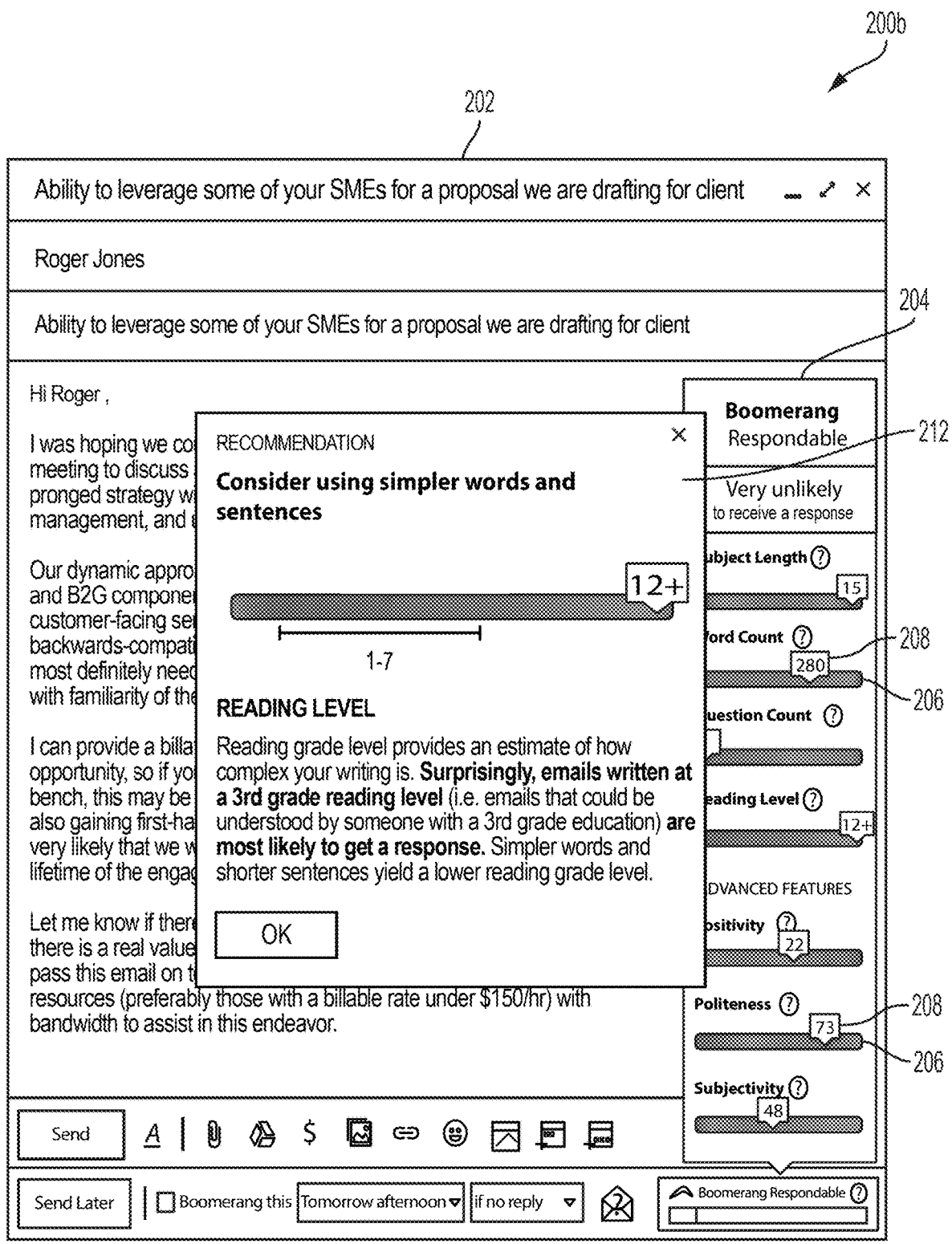

FIGS. 2A and 2B show screen shots 200a and 200b of a message composing window 202 displaying representations of message quality scores and a response likelihood. The message composing window 202 can include text associated with a composed message and a graphical object 204 for displaying representations (or indications) of determined quality scores and a generated response likelihood associated with the composed message shown in the composing window 202. While FIGS. 2A and 2B illustrate the graphical object 204 as a vertical rectangular graphical object located along a left side of the message composing window 202, the rendering component 108 can display the graphical object 204 according to various other shapes or locations. For example, the rendering component 108 may display the graphical object 204 along a bottom portion of the message composing window 202. The rendering component 108 may display the graphical object 204 as a square shape, elliptical shape, or some other shape. In some instances, the rendering component 108 may render the graphical object 204 as a separate window (e.g., separate from the message composing window 202) adjacent to the message composing window 202.

The graphical object 204 can include indications, or graphical representations, of the determined quality scores and the response likelihood associated with the composed message displayed within the message composing window 202. The rendering component 108 can present each quality score (associated with a respective quality feature) using a respective graphical element indicative, for example, of a respective value (e.g., a value of a respective quality feature). For instance, the graphical object 204 can include a separate graphical element for each of the quality features; subject length, word count (or message body length), question count, reading level, positivity, politeness, and subjectivity. Each graphical element can include a sliding bar 206 representing a range of feature values for the respective quality feature and a slider 208 configured to slide along the sliding bar 206. The position of the slider 208 along the sliding bar 206 can represent the value of the quality score the determined feature value for the respective feature. Each sliding bar 206 may be a color bar illustrating a range of colors representing a respective range of values of the quality feature represented by that sliding bar 206. The color of the slider 208 associated with a given sliding bar 206 can change as the position of the slider 208 along the sliding bar 206 changes. For instance, the color of the slider 208 can be similar (or substantially similar) to the color of the sliding bar 206 at the position where the slider 208 is located along the sliding bar 206. For example, the slider 208 can take a green color when located at a position along the respective slider bar 206 that is characterized by a green color, and can take a red color when it is aligned with a red portion of the slider bar 206.

The graphical object 204 can include a graphical element 210 representative of the response likelihood generated by the decision forest. The graphical element 210 can present the response likelihood via a plurality of expressions, such as "very unlikely," "unlikely" "likely," and "very likely." In some instances, the graphical element 210 can present the response likelihood using a range of numerical values, such as percentage values or decimal values between 0 and 1. In some implementations, the graphical element 210 may present, or represent, a score for the overall quality of the drafted message. The overall quality of the drafted message may not necessarily be expressed or described as a likelihood of the drafted message resulting into a response from the intended recipient. For example, the overall quality score may be a weighted average of scores associated with a combination of the subject length, word count, question count, reading level, positivity, politeness and/or subjectivity. The graphical element 210 may include a numerical score, a filled-in-tiles bar, or other graphical representation that illustrates the overall quality score of the drafted message. Also, while FIGS. 2A and 2B illustrate the graphical elements representing quality scores in terms of sliding bars 206 and corresponding sliders 208, the rendering component 108 may present the quality scores using numerical values or other graphical elements such as circular charts or variable length bars (e.g., a display bar whose varying length or height represents a numerical value).

FIG. 2B is a screen shot illustrating an interactive graphical element representing a quality feature or a respective quality score. Graphical elements representing quality features, such as subject length, word count (or message body length), question count, reading level, positivity, politeness, and subjectivity, can be presented (or rendered) using interactive graphical elements. For example, a user can select a graphical element by clicking, touching, or hovering over the graphical element. Upon user selection, the rendering component can cause the client device 102 to display additional information related to the quality score (or quality feature) represented by the selected graphical element. For instance, as illustrated in FIG. 2B, upon selection of a graphical element (e.g., graphical element representative of reading level), the rendering component 108 can display a pop-up window (or pop-up vide object) 212 including information indicative of, for examples, one or more factors that are relevant in determining the respective quality score, one or more recommendations to improve the respective determined quality score, or a combination thereof.

The client device 102 and the data processing system 114 can perform the process of assessing and displaying the quality scores and the response likelihood multiple times while the electronic message is composed on the client device 102. For instance, each time a pause event (with regard to the composing of the electronic message) is detected, the composing monitoring component 106 can retrieve input data (or a portion thereof) stored in the message composing container 110, and initiate a new assessment process of the quality factors by providing the retrieved data to the analysis component 116. Once the analysis component 116 and the prediction component 118 update the quality scores and the response likelihood for the composed message based on the new data obtained from the composing monitoring component 106, the rendering component 108 can display the updated quality scores and the response likelihood on the display of the client device 102. As such, the user of the client device 102 can view changes in the quality scores and the response likelihood in real time as he continues drafting or as he edits the electronic message. The real time feedback allows the user to update or edit the electronic message (e.g., repeatedly if needed) until the respective quality is substantially improved or the response likelihood becomes relatively high.

Once the composed electronic message is sent to the intended recipient, the software module 104 or the training component 120 may monitor electronic messages received by a messaging account associated with the user of the client device 102 (or the sender of the composed electronic message) to determine whether or not a response message is received from the recipient. For example, the software module 104 or the training component 120 may monitor an inbox associated with the sender of the composed message. The training component 120 may update parameters of a trained neural network, a trained deep learning model, or a trained decision forest based on the composed message sent to the recipient and whether or not the recipient responded to the sender.

In some instances, the analysis component 116 or the prediction component 118 can be implemented in the client device 102. For instance, the client device 102 can include a light version of the analysis component 116 including modules to determine the subject length, the word count (or message body length), the question count, and the reading level. The light version of the analysis component 116 may not include a positivity neural network, a politeness neural network or a subjectivity neural network if such neural networks are computationally too complex to execute on a client device. For example, a software module 104 including a composition monitoring component 106, a rendering component 108, a light version of the analysis component 116 (e.g., without the neural networks for positivity, politeness, and subjectivity) and a light version of the prediction component 118 (e.g., using values for subject length, word count, questions counts, and reading level as input) can generate and display quality scores and a response likelihood value within a fraction of a second (e.g., within 0.2 seconds, 0.25 seconds or 0.3 seconds) from the time a pause event is detected. The system implementation including the client device 102 and data processing system 114, as described with regard to FIG. 1, can generate and display the quality scores and the response likelihood value within a fraction of a second (e.g., within 0.5 seconds, within 0.6 seconds, or within 0.7 seconds) from the time a pause event is detected at the client device 102.

The data processing system 114 can provide the two alternative solutions (e.g., an all-client implementation and a client-server implementation) for users by providing two types of software modules 104 for downloading on client devices 102. For example, the version of the software module 104 allowing all-client implementation can be provided for free or for a lesser fee compared to the version of the software module 104 allowing client-server implementation.

Figure 3:
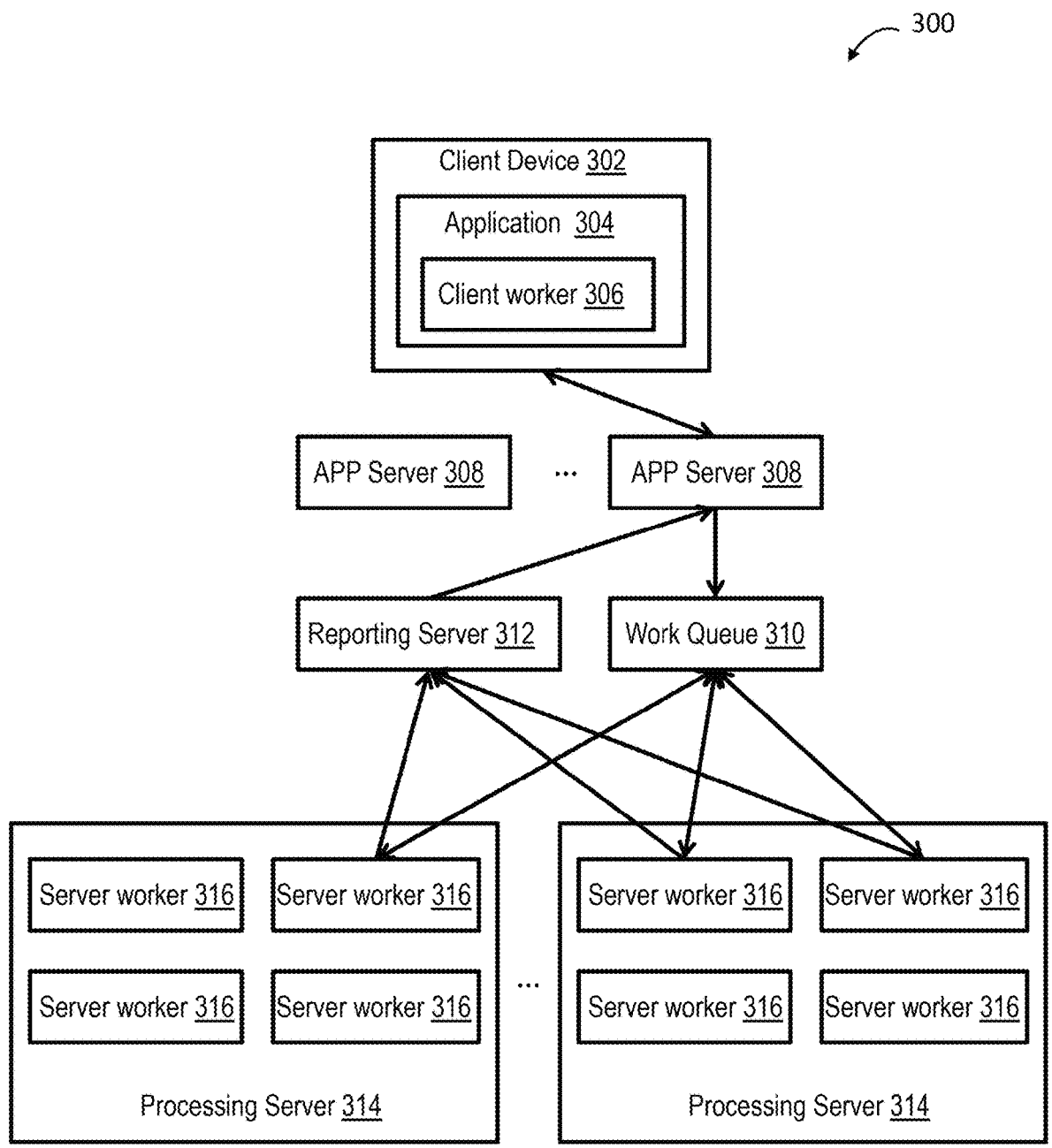
FIG. 3 is a diagram illustrating an architecture of a client-server system for assessing and rendering message quality features of an email message while the email message is composed on a client device.

FIG. 3 is a diagram illustrating an architecture of a client-server system 300 for assessing and rendering message quality features of an email message while the email message is composed on a client device. The system 300 can include a software module 304, executable on a client device 302, including one or more client workers 306. The system 300 can also include a plurality of application servers 308, one or more work queues 310, one or more reporting servers 312, and one or more processing servers 314. Each processing server 314 can include a plurality of server workers 316. The applications servers 308, the work queues 310, the reporting servers 312, and the processing servers 314 can be computer servers or components of the data processing system 114.

The software module 304 can include one or more client workers (or client software engines) 306 configured to perform processes associated with composite monitoring component 106 or the rendering component 108. For example, the client worker(s) 306 can be configured to retrieve data from the message composing container 110, filter out coding or formatting words (or symbols), and transmit the retrieved and filtered data to the an application server 308. The software module 304 may include one or more software components (e.g., software components associated with rendering the quality scores or the response likelihood values) that are implemented as extension(s) or plug-in(s) to a browser, an email application (e.g., Outlook), or other application running on the client device 302. Such application can be a mobile application, a desktop application, a web application, or a combination thereof.

The application servers 308 can be web servers configured to receive processing tasks from client devices 102, and distribute the received tasks among work queues 310. For instance, the application server 308 receiving composed message data from the client device 102 can determine which work queue 310, e.g., among a plurality of work queues 310, to forward the data to. Each application server 308 may monitor load associated with each of a plurality of work queues 310. The application server 308 may be configured to forward new tasks (or composed message data) to the worker queue(s) 310 that are least loaded (or less loaded than other work queues 310). Each work queue 310 can be configured to serve tasks to one or more respective server workers 316. The work queues 310 can forward processing tasks to server workers 316 according to a first-in-first-out (FIFO) pattern.

The system 300 can include a plurality of processing servers 314, each including a plurality of server workers 316. The server workers 314 can be communicatively coupled to the work queues 310 and the work mam The server workers 316 can perform separate processes associated with, for example, the analysis component 116, the prediction component 118, or the training component 120. For example, the plurality of server workers 316 can include server workers to execute positivity neural networks, server workers to execute politeness neural networks, server workers to execute subjectivity neural networks, and server workers to execute decision forests. In some instances, when receiving composed message data from the client device 302, the application server 308 can generate multiple tasks (e.g., a separate task for assessing positivity, a separate task for assessing politeness, a separate task for assessing subjectivity, and another task for assessing other quality features such as subject length, word count, questions count, and reading level. The application server 308 may forward the generated tasks to separate work queues 310. The generated tasks may be performed by separate server workers 316 running in parallel on separate processing cores of the processing servers 314. For example, positivity, politeness, and subjectivity can be assessed by separate server workers 316 executing simultaneously in parallel on separate processing cores of the processing servers 314. Applying parallel processing when assessing message quality scores, or when executing the neural networks or deep learning models, allows for fast and real time assessment (e.g., within a few seconds, a second, or a fraction of a second) of message quality and response likelihood. Once the server workers 316 determine the quality scores, the server workers can forward the results to the reporting server 312 and another work queue 310. The other work queue can forward the received results to another server worker 316 for determining the response likelihood for the composed message. The other server worker 316 can provide the determined response likelihood to the reporting server 312. The reporting server 312 can transmit the determined quality scores and the determined response likelihood to the application server 308 (e.g., the application server that received the composed message data from the client device 302). The application server 308 can forward the received quality scores and the received response likelihood to the client device 102 for displaying to the respective user.

The architecture described in FIG. 3 can allow serving a plurality of client devices 102 in real time (e.g., assessing and providing message quality scores and response likelihood within few seconds, within a second, or within a fraction of a second). The application servers 308, the work queues 310, the reporting servers 312, or the processing servers 314 can include cloud computer servers, enterprise computer servers, or a combination thereof. While the architecture in FIG. 3 is discussed with regard to email, a similar architecture can used in connection with other electronic messaging solutions.

Figure 4:
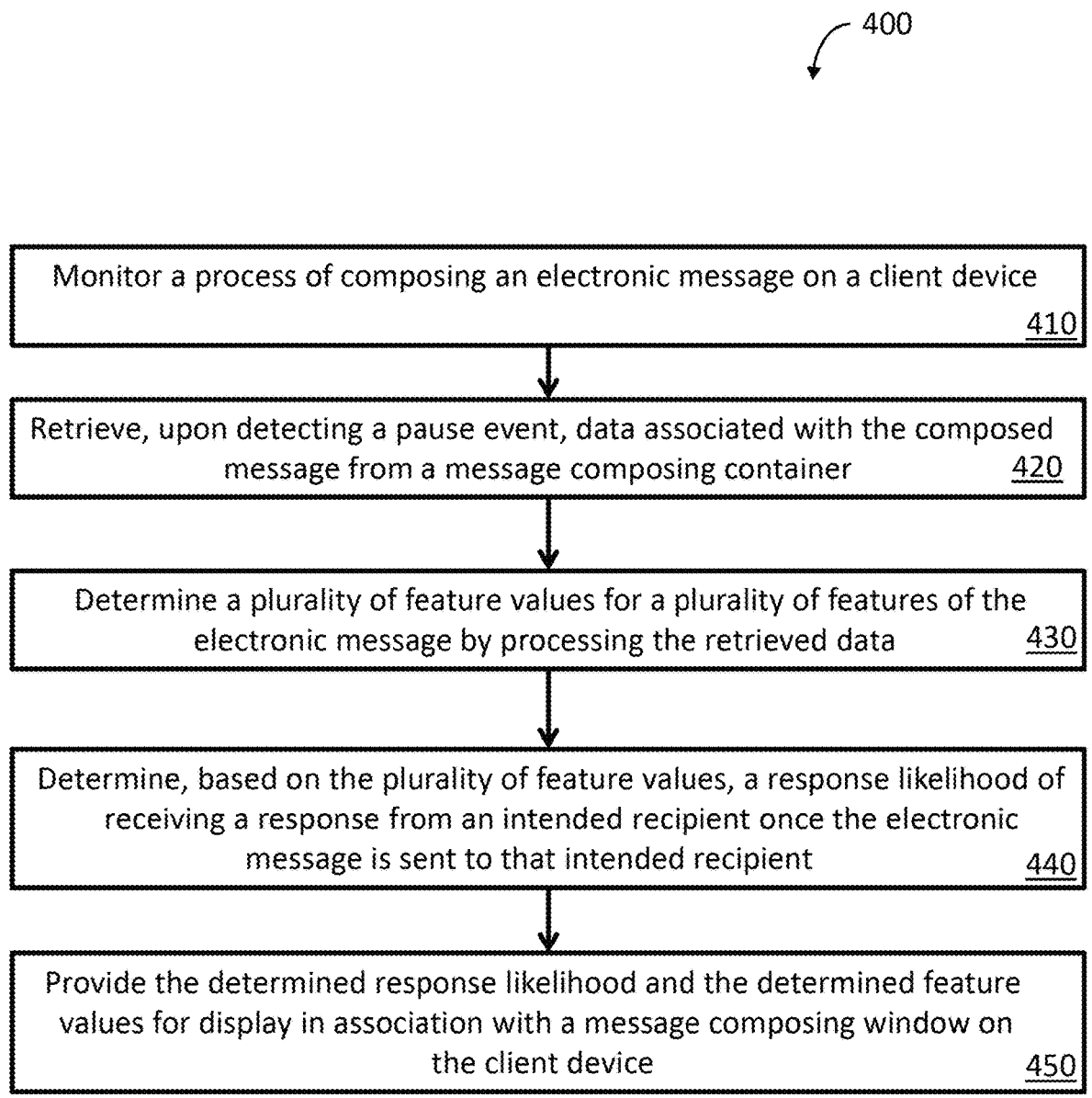
FIG. 4 shows a flowchart illustrating a method 400 of dynamically assessing and displaying quality measures of electronic messages while the electronic messages are composed on client devices.

FIG. 4 shows a flowchart illustrating a method 400 of dynamically assessing and displaying quality measures of electronic messages while the electronic messages are composed on client devices. The method 400 can include one or more processors monitoring a process of composing an electronic message on a client device (ACT 410), and retrieving, upon detecting a pause in the composing process, data associated with the composed message from a message composing container (ACT 420). The method 400 can include the one or more processors determining a plurality of feature values for a plurality of features of the electronic message by processing the retrieved data (ACT 430). The method 400 can include the one or more processors determining, based on the determined plurality of feature values, a likelihood (or response likelihood) of receiving a response from an intended recipient (or receiving entity) once the electronic message is sent to that intended recipient (ACT 440). The method 400 can also include the one or more processors providing the determined response likelihood and the determined feature values for display in association with a message composing window displaying the composed message on the client device (ACT 450).

Referring to FIGS. 1-4, the method 400 can include the one or more processors monitoring a process of composing an electronic message on a client device (ACT 410). The one or more processors may be initiate (or launch) one or more software module (e.g., the software module 104 or 304, or the composition monitoring component 106), for example, responsive to initiation of an electronic message composing event on the client device 102. For example, one or more processors may launch the software module(s) upon the user of the client device 102 opens a "new email" window to compose an email for sending to a recipient. The one or more processors may launch the software module(s) upon the user of the client device 102 starts composing a message, for example, on a chat application, a SMS application, a VoIP application, or a teleconference application.

The one or more processors can monitor the process of composing the electronic message or monitor receipt of text via an input interface of the client device associated with the electronic message being composed on the client device 102. For instance, the one or more processors may monitor changes to data stored in the message composing container 110. The one or more processors may monitor write operations or delete operations executed by the client device 102 in association with the message composing container 110, responsive to changes made by the user of client device to the electronic message being composed. In monitoring the process of composing the electronic message, the one or more processors may keep track of time instances associated with memory operations (e.g., delete operations or write operations) executed by the client device 102 to update date stored in the message composing container 110. The one or more processors may keep track of the time elapsed since the latest executed memory operation executed by the client device 102 to update date stored in the message composing container 110. The one or more processors may keep track of the amount of data (e.g., in bytes) stored in the message composing container 110.

In some instances, monitoring the process of composing the electronic message can include the one or more processors monitoring a user interface displaying the composed electronic message, or the input interface used by the user to input text as part of the composed electronic message. The one or more processors may monitor calling of functions associated with a display of the client device 102 (e.g., functions to update displayed electronic message), functions associated with the memory of the client device 102 (e.g., write function), or functions associated with the input interface of the client device 102. In particular, one or more processors may monitor the calling of such functions by (or in association with) an electronic messaging application used to compose the electronic message, responsive to user interaction with the input interface when composing the electronic message.

The one or more processors can monitor pauses in the process of composing the electronic message. The one or more processors may detect a pause event by maintaining a timer indicative of time elapsed since a latest executed operation (e.g., a memory operation to write or delete data in the message composing container 110, display operation to update display of the composed message, or operations to receive data input via the user interface responsive to the user typing input text) related to an update of the composed message, and comparing the time indicated by the timer to the time threshold value defining the pause. For example, if pause events are defined as time periods longer than 0.2 seconds during which no update is made to the composed message, then the one or more processors can detect a pause event upon the timer exceeds 0.2 seconds.

The method 400 can include the one or more processors retrieving, upon detecting a pause in the composing process, data associated with the composed message from a message composing container (ACT 420). Upon detecting a pause event associated with the composing of the electronic message, the one or more processors can initiate a process of analyzing the message composed so far and evaluating or assessing respective quality (or quality scores). For instance, the one or more processors may retrieve the text stored in the message composing container 110 or a portion thereof (e.g., change with respect to previously retrieved text), responsive to detection of a pause event associated with the composing of the electronic message. The one or more processors may remove formatting-specific words or symbols or coding words or symbols (e.g., HTML-specific text or tags) from the retrieved text. By eliminating formatting-specific or coding-specific words or symbols, the one or more processors may extract from the retrieved text words and expressions typed by the user of the client device 102, as part of the composed electronic message, for use in analyzing the composed electronic message and assessing the respective quality.

The one or more processors can be processor(s) of the client device 102 (e.g., in an all-client implementation) or processors associated with the client device 102 and one or more computer servers of the data processing system 114 (e.g., in client server configuration as illustrated in FIGS. 1 and 3). In a client-server configuration, the processor(s) of the client device 102 may transmit the composed message data to the computer server(s) for analyzing and assessing respective quality.

The method 400 can include the one or more processors determining a plurality of feature values for a plurality of features of the electronic message by processing the retrieved data (ACT 430). The one or more processors can analyze the composed message data to assess a respective plurality quality features, as discussed above with respect to FIGS. 1 and 3. The quality features can include subject length, word count, questions count, reading level, positivity, politeness, subjectivity, or a combination thereof. The one or more processors can execute trained machine learning models (e.g., neural networks, convolutional neural networks, deep neural networks, convolutional deep neural networks, deep belief networks, recurrent neural networks, or other deep learning models known in the art) for assessing separate quality features. The one or more processors can train the machine learning models (e.g., offline) using training data that includes, for example, a plurality of electronic messages and corresponding quality scores, as discussed above with regard to FIG. 1. The training data can include electronic messages associated with the sender of the composed message, electronic messages associated with other users, or a combination thereof.

The method 400 can include the one or more processors determining, based on the determined plurality of feature values, a likelihood (or response likelihood) of receiving a response from an intended recipient (or receiving entity) once the electronic message is sent to that intended recipient (ACT 440). The one or more processors can predict a response likelihood (e.g., likelihood of the message sender receiving a response from the intended recipient once the composed message is sent) using the determined quality scores determined. The one or more processors can employ a decision forest (e.g., a set of decision trees) to determine the response likelihood, as discussed with respect to FIG. 1. The one or more processors can train the decision forest (e.g., offline) using training data that can include a plurality of electronic messages and respective indications of whether or not those electronic messages resulted in responses sent by respective recipients to respective senders. The training data can include electronic messages associated with the sender of the composed electronic message, electronic messages associated with other users, or a combination thereof. The one or more processors may apply higher weighting values to training data portions associated with the sender of the composed electronic message compared to portions associated with other users.

As discussed above with respect to FIG. 1, the one or more processors may train a separate decision forest for each user (e.g., sender), each sender-recipient pair, each possible recipient profile, each sender-recipient relationship, or each possible message context. The one or more processors can train the various decision forests, for example, using distinct training data sets or different weightings for training data elements. If a plurality decision forests are available to the user of the client device 102, the one or more processors can select one of the decision forests for determining the response likelihood based on, for example, information associated with the sender of the electronic message, the intended recipient, or the composed message. The one or more processors can determine the response likelihood using the selected decision response and the determined quality scores. In some implementations, the one or more processors may train one or more neural network or may employ other machine learning techniques (or machine learning algorithms), instead of decision forests. For instance, when a small set of training data (e.g., using only data associated with the user of the client device 102), the one or more processors may train one or more neural networks instead of decision forest(s). Additionally, in some other implementations any other form machine learning technique may be utilizes, including any form of logisitic regression, support vector machines, or meta-classifiers The method 400 can include the one or more processors providing the determined response likelihood (or an overall quality score) and the determined feature values (or quality scores) for display in association with a message composing window displaying the composed message on the client device (ACT 450). The one or more processors can cause display of the determined response likelihood and the determined quality scores as discussed with respect to FIGS. 2A and 2B.

The one or more processors can repeat the process of monitoring for pause events, retrieving and analyzing data associated with the composed electronic message, and displaying determined quality scores and response likelihood multiple times while the electronic message is composed. Once the composed electronic message is sent to the intended recipient, the one or more processors can monitor received messages associated with the sender of the composed message to determine whether or not a response was received from the recipient. The one or more processors can use the sent electronic message and indication(s) of whether or not a response was received from the recipient to update the trained decision forest or trained machine learning models for determining quality scores.

The methods described herein can be implemented as computer executable instructions that can be stored on a computer-readable medium. When executed by one or more processors of one or more computing device, the executable instructions can cause the one or more processors to perform the methods described herein.

Figure 5:
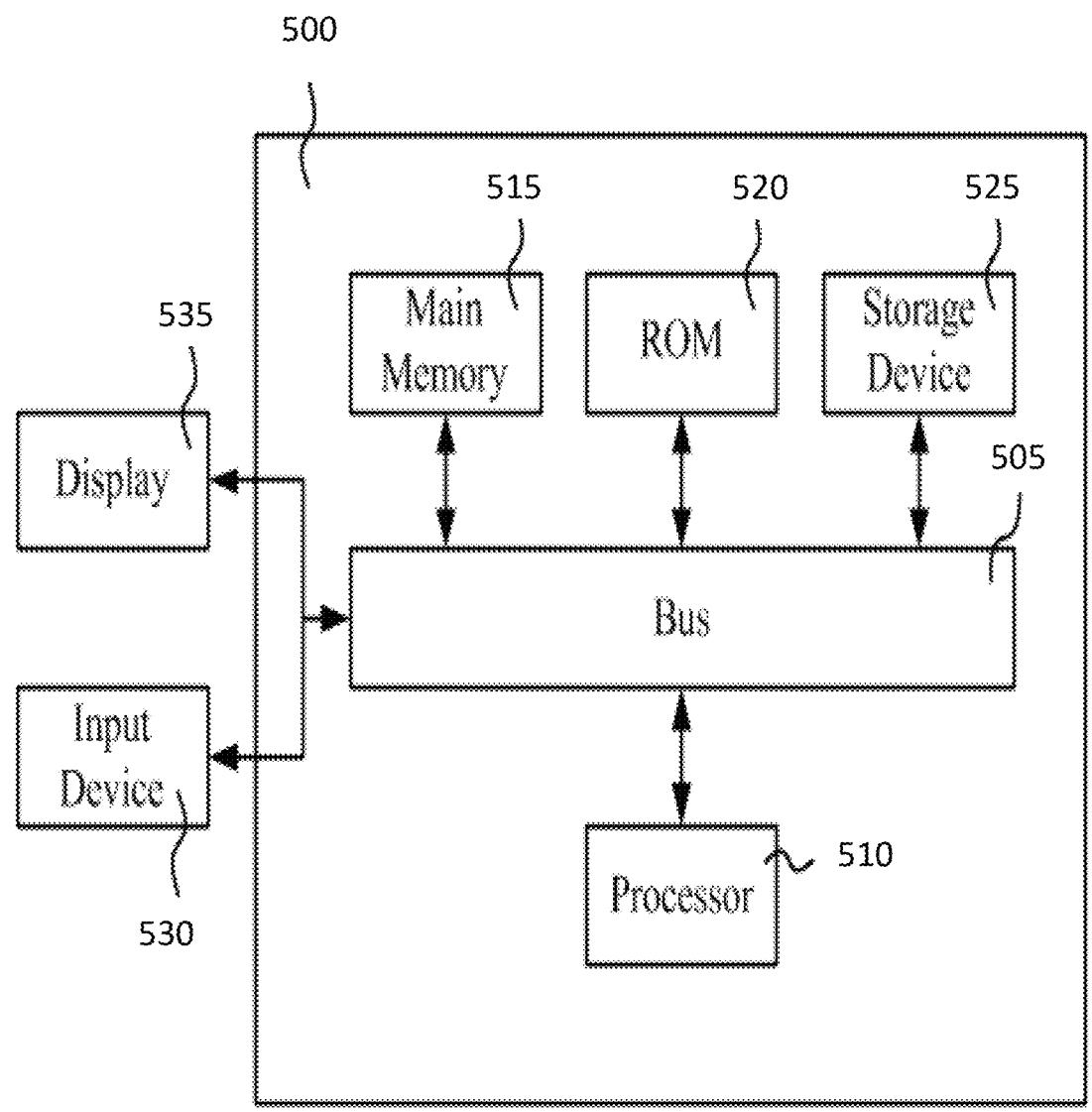
FIG. 5 is a block diagram depicting an implementation of a general architecture for a computer system that may be employed to implement various elements of the systems and methods described and illustrated herein.

FIG. 5 is a block diagram of a computer system 500 that can be used to implement the client device 102 or 302, the computer server(s) of the data processing system 114, the application server 308, the work queue 310, the reporting server 312, the processing server 314 and other components described herein. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to various implementations, the processes or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes or method ACTs described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, software module or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A system to dynamically assess the quality of electronic messages while composed on client devices, the system comprising:
    a client device with a memory to store processor-executable instructions and at least one processing unit communicatively coupled to the memory; and
    a software module comprising a text analysis component and a predictive component that executes at least in part on said at least one processing unit of said client device, wherein said software module is configured to:

monitor text input, via an input interface of the client device, as part of an electronic message while the electronic message is composed on the client device, the text stored in a message composing container;

automatically retrieve, responsive to detection of a pause in inputting text, a portion of the text from the message composing container;

automatically transmit the retrieved portion of the text to one or more computer servers via a communication network;

automatically receive, by the client device from said one or more computer servers via the communication network, a determination of a likelihood of receiving a response to said electronic message, said determination of the likelihood of receiving the response to said electronic message determined by said one or more computer servers, based at least in part, on a plurality of feature values for a plurality of features of said retrieved portion of text; and automatically display, an indication of the likelihood of receiving the response to said electronic message on the client device in conjunction with a message composing window displaying the text, the indication of the likelihood of receiving the response to said electronic message representing real-time dynamic feedback provided during a process of composing the message.

2. The system of claim 1 further comprising a software module configured to:

automatically retrieve, responsive to detection of a second pause in inputting text, a second portion of the text from the message composing container;

automatically transmit, by the client device to the one or more computer servers via the communication network, the second portion of the text;

automatically receive, by the client device from said one or more computer servers via the communication network, a determination of a second likelihood of receiving the response to said electronic message, said determination of the second likelihood of receiving the response to said electronic message determined by said one or more computer servers, based at least in part, on a plurality of feature values for a plurality of features of said retrieved second portion of text; and automatically display, an indication of the determined second likelihood of receiving the response to said electronic message on the client device in conjunction with the message composing window displaying the text.

3. The system of claim 1, wherein the plurality of features include at least two of:
a length of a subject field of the electronic message;
a word count associated with the text;
a question count associated with the text;
a reading level;
a positivity level;
a politeness level; and
a subjectivity level.

4. The system of claim 1 wherein the software module is further configured to cause the display of a plurality of graphical elements, each graphical element representative of a respective feature of the plurality of features.

5. The system of claim 4, wherein each graphical element includes a slider bar representing a range of feature values for the respective feature and a slider that slides automatically along the slider bar, a position of the slider along the bar representing the determined feature value for the respective feature.

6. The system of claim 5, wherein the slider bar is indicative of a range of colors responsive to the range of feature values for the respective feature along the slider bar, the slider associated with the slider bar having a color similar to a color of the slider bar at the position where the slider is located along the slider bar.

7. The system of claim 6, wherein the slider takes a color similar to a color of the slider bar at the position where the slider is located along the slider bar.

8. The system of claim 4, wherein each graphical element is selectable.

9. The system of claim 4, wherein the software module is configured to cause, upon selection of a graphical element of the plurality of graphical elements, the display of at least one recommendation to improve the feature value for the feature represented by the selected graphical element.

10. The system of claim 1 wherein said determination of the likelihood of receiving the response to said electronic message is determined based, at least in part, on one or more decision trees.

11. A method of dynamically assessing the quality of electronic messages while composed on client devices, the method comprising:

monitoring, by one or more processors, text input as part of an electronic message while the electronic message is composed on the client device, the text stored in a message composing container;

automatically retrieving, by the one or more processors and responsive to detection of a pause in inputting text, a portion of the text from the message composing container;

automatically transmitting, by the client device to one or more computer servers via a communication network, the retrieved portion of the text;

automatically receiving, by the client device from said one or more computer servers, a determination of a likelihood of receiving a response to said electronic message, said determination of the likelihood of receiving the response to said electronic message determined by said one or more computer servers, based at least in part, on a plurality of feature values for a plurality of features of said retrieved portion of text; and automatically displaying an indication of the determined likelihood of receiving a response to said electronic message on the client device in conjunction with a message composing window displaying the text, the indication of the likelihood of receiving the response to said electronic message representing real-time dynamic feedback provided during a process of composing the message.

12. The method of claim 11, further comprising:

retrieving, by the at least one processor and responsive to detection of a second pause in inputting text, a second portion of the text from the message composing container;

automatically transmitting, by the client device to the one or more computer servers via the communication network, the retrieved portion of the text;

automatically receiving, by the client device from said one or more computer servers, a determination of the second likelihood of receiving the response to said electronic message, said determination of the second likelihood of receiving the response to said electronic message determined by said one or more computer servers, based at least in part, on a plurality of feature values for a plurality of features of said second portion of text; and automatically displaying an indication of the determined second likelihood of receiving a response to said electronic message on the client device in conjunction with a message composing window displaying the text.

13. The method of claim 11, wherein the plurality of features includes at least two of:
   a length of a subject field of the electronic message;
   a word count associated with the text;
   a question count associated with the text;
   a reading level;
   a positivity level;
   a politeness level; and
   a subjectivity level.

14. The method of claim 11, further comprising:
   displaying a plurality of graphical elements, each graphical element representative of a respective feature of the plurality of features.

15. The method of claim 14, wherein each graphical element includes a slider bar representing a range of feature values for the respective feature and a slider that slides automatically along the slider bar, wherein a position of the slider along the slider bar representing the determined feature value for the respective feature.

16. The method of claim 15, wherein the slider bar is indicative of a range of colors responsive to the range of feature values for the respective feature along the slider bar, the slider associated with that slider bar having a color similar to a color of the slider bar color at the position where the slider is located along the slider bar.

17. The method of claim 14, wherein each graphical element is selectable.

18. The method of claim 14, further comprising:
   displaying, upon selection of a graphical element of the plurality of graphical elements, at least one recommendation to improve the feature value for the feature represented by the selected graphical element.

19. The method of claim 11, wherein said determination of the likelihood of receiving the response to said electronic message is determined based, at least in part, on one or more decision trees.

20. A non-transitory computer-readable medium comprising code instructions stored thereon, the computer code instructions, when executed by one or more processors, cause the one or more processors to:
   monitor text input as part of an electronic message while the electronic message is composed on a client device, the text stored in a message composing container;
   automatically retrieve, responsive to detection of a pause in inputting text, a portion of the text from the message composing container;
   automatically transmit, by the client device to one or more computer servers via a communication network, the retrieved portion of the text;
   automatically receive, by the client device from said one or more computer servers, a determination of a likelihood of receiving a response to said electronic message, said determination of the likelihood of receiving the response to said electronic message determined by said one or more computer servers, based at least in part, on a plurality of feature values for a plurality of features of said retrieved portion of text; and
   automatically display an indication of the determined likelihood of receiving the response to said electronic message on the client device in conjunction with a message composing window displaying the text, the indication of the likelihood of receiving the response to said electronic message representing real-time dynamic feedback provided during a process of composing the message.

* * * * *